United States Patent
Charbit et al.

(10) Patent No.: US 9,451,616 B2
(45) Date of Patent: Sep. 20, 2016

(54) WIRELESS COMMUNICATION SYSTEM AND METHOD

(75) Inventors: Gilles Charbit, Farnborough (GB); Erlin Zeng, Beijing (CN); Na Wei, Beijing (CN)

(73) Assignee: BROADCOM CORPORATION, Irvine, CA (US)

(*) Notice: Subject to any disclaimer, the term of this patent is extended or adjusted under 35 U.S.C. 154(b) by 194 days.

(21) Appl. No.: 14/383,250

(22) PCT Filed: Mar. 6, 2012

(86) PCT No.: PCT/CN2012/071984
§ 371 (c)(1),
(2), (4) Date: Sep. 5, 2014

(87) PCT Pub. No.: WO2013/131245
PCT Pub. Date: Sep. 12, 2013

(65) Prior Publication Data
US 2015/0031377 A1    Jan. 29, 2015

(51) Int. Cl.
*H04W 72/00* (2009.01)
*H04W 72/04* (2009.01)
*H04W 48/08* (2009.01)
*H04W 28/18* (2009.01)
*H04W 48/20* (2009.01)
*H04L 5/00* (2006.01)

(52) U.S. Cl.
CPC ........ *H04W 72/0453* (2013.01); *H04L 5/0098* (2013.01); *H04W 48/08* (2013.01);
(Continued)

(58) Field of Classification Search
CPC ... H04W 48/08; H04W 48/20; H04W 72/00; H04W 28/18; H04W 72/0453; H04L 5/001
USPC ................................. 455/450, 436
See application file for complete search history.

(56) References Cited

U.S. PATENT DOCUMENTS 8,837,422 B2 * 9/2014 Chen ............... H04L 5/0023
370/330
2009/0190535 A1   7/2009 Hassan et al.
(Continued)

FOREIGN PATENT DOCUMENTS

CN          101742563 A    6/2010

OTHER PUBLICATIONS

Luis G.U. Garcia, et. al, Autonomous Component Carrier Selection: Interference Management in Local Area Environments for LTE-Advanced; Sep. 2009; IEEE Communication Magazine, pp. 110-116.
(Continued)

*Primary Examiner* — David Q Nguyen
(74) *Attorney, Agent, or Firm* — Oblon, McClelland, Maier & Neustadt, L.L.P.

(57) ABSTRACT

Embodiments of the invention provide methods, devices and computer programs arranged to control access to a Secondary Cell Carrier (SCC) by a user terminal. The user terminal having a first functional state in which the user terminal is arranged to monitor for a broadcast channel associated with the SCC, and a second functional state, different to said first functional state. One embodiment comprises an apparatus comprising a processing system arranged to cause the apparatus to: receive data indicative of a plurality of operational modes assigned to the SCC; and transmit a signalling message comprising data indicative of said plurality of operational modes for receipt by the user terminal, whereby to configure the user terminal into the first functional state, wherein the user terminal is arranged to selectively request access to resources of the SCC on the basis of a comparison between data contained in said signalling message and data contained in a transmission received on the broadcast channel.

20 Claims, 7 Drawing Sheets

(52) U.S. Cl.
CPC .......... *H04W72/005* (2013.01); *H04L 5/001* (2013.01); *H04L 5/0035* (2013.01); *H04L 5/0044* (2013.01); *H04L 5/0064* (2013.01); *H04W 28/18* (2013.01); *H04W 48/20* (2013.01); *H04W 72/00* (2013.01)

(56) References Cited

U.S. PATENT DOCUMENTS

2010/0285805 A1* 11/2010 Matsuo ................ H04L 5/0007
455/436

2011/0312328 A1* 12/2011 Choi ..................... H04L 5/0062
455/450

OTHER PUBLICATIONS

3GPP TR 36.913 V8.0.1 (Mar. 2009),3rd Generation Partnership Project;Technical Specification Group Radio Access Network;Requirements for further advancements for Evolved Universal Terrestrial Radio Access (E-UTRA)(LTE Advanced)(Release 8);15 Pages.

* cited by examiner

WIRELESS COMMUNICATION SYSTEM AND METHOD

TECHNICAL FIELD

The present invention relates generally to wireless communication systems, methods, devices and computer programs, and more specifically relates to controlling access to a Secondary Cell Carrier (SCC).

BACKGROUND

The following abbreviations used in the specification and/or the drawings are defined as follows:
- CA Carrier Aggregation
- CC Component Carrier
- DL Downlink
- DM RS Demodulation Reference Signal
- eNB Enhanced Node B. Name for Node B in LTE
- FFT Fast Fourier Transform
- ICIC Inter-Cell Interference Control
- LTE Long Term Evolution
- LTE-A Long Term Evolution Advanced
- MDCH Master Discovery Channel
- PBCH Physical Broadcast Channel
- Pcell Primary Cell
- PCC Primary Cell Carrier
- PDCH Physical Discovery Channel
- PDCCH Physical Downlink Control Channel
- P-SCH Primary Synchronisation Channel
- PSS Primary Synchronisation Signal
- PUSCH Physical Uplink Shared Channel
- RRC Radio Resource Control
- RRH Remote Radio Head
- RSRP Reference Symbol Received Power
- RSRQ Reference Symbol Received Quality
- Scell Secondary Cell
- SCC Secondary Cell Carrier
- S-SCH Secondary Synchronisation Channel
- SSS Secondary Synchronisation Signal
- TTI Time Transmit Interval
- UE User Equipment
- UL Uplink
- CRS Cell-specific Reference Signal
- CSI-RS Channel state information Reference Signal Of particular interest herein are the further releases of 3GPP LTE (e.g., LTE Rel-10) targeted towards future IMT-A systems, referred to herein as LTE-Advanced (LTE-A). Reference in this regard may be made to 3GPP TR 36.913, V8.0.1 (2009 03), 3rd Generation Partnership Project; Technical Specification Group 30 Radio Access Network; Requirements for Further Advancements for E-UTRA (LTE-Advanced) (Release 8). A goal of LTE-A is to provide significantly enhanced services by means of higher data rates and lower latency with reduced cost. LTE-A is directed toward extending and optimizing the 3GPP LTE Rel-8 radio access technologies to provide higher data rates at low cost.

LTE-A should operate in spectrum allocations of different sizes, including wider spectrum allocations than those of Rel-8 LTE (e.g. 10-100 MHz) to achieve the peak data rate of 100 Mbits for high mobility and 1 Gbits for low mobility. It has been agreed that Carrier Aggregation (CA) is to be considered for LTE-A in order to support bandwidths larger than 20 MHz.

CA permits an LTE base station to group several distinct channels into one logical channel, thereby aggregating two or more component carriers (CCs) and enabling very high peak traffic channel data rates.

CA in LTE-Advanced extends the maximum bandwidth in the uplink (UL) or downlink (DL) directions by aggregating multiple carriers within a frequency band (intra-band CA) or across frequency bands (inter-band CA). A primary cell carrier (PCC) using LTE technology may be configured on a LTE licensed band for primary access providing mobility, security and state management for user terminals while a secondary cell carrier (SCC) using another carrier (e.g., a carrier using WLAN technology) may be configured/activated on an un-licensed band for secondary access to provide additional data plane transport. The SCC may have one or more secondary cells (SCell) for providing radio connectivity to user terminals.

Finding a free channel in an unlicensed band can be difficult because there are many other systems that might utilize frequencies within the licensed band. Potential co-existing systems may include: IEEE 802.11 b/alg/nlac, Bluetooth, Zigbee, etc. To use the unlicensed band, the LTE systems are required to adopt agile spectrum and time sharing techniques, and user terminals must conclude time/frequency synchronisation quickly.

To that end, a physical channel referred to as a Physical Discovery Channel (PDCH) that is optimized to SCC discovery has previously been considered. The PDCH has a long periodicity, which may be a few seconds, and is considered to be suitable for SCC discovery.

However, the inventors consider the PDCH to be unsuitable for accurate time and frequency synchronisation on the SCC.

Embodiments are directed towards providing an improved method for time and frequency synchronisation in inter-band carrier aggregation.

SUMMARY

In a first exemplary embodiment there is provided an apparatus for use in controlling access to a Secondary Cell Carrier (SCC) by a user terminal in a communication network, said user terminal having a first functional state in which the user terminal is arranged to monitor for a broadcast channel associated with the SCC, and a second functional state, different to said first functional state, the apparatus comprising a processing system arranged to cause the apparatus to: receive data indicative of a plurality of operational modes assigned to the SCC; and transmit a signalling message comprising data indicative of said plurality of operational modes for receipt by the user terminal, whereby to configure the user terminal into the first functional state, wherein the user terminal is arranged to selectively request access to resources of the SCC on the basis of a comparison between data contained in said signalling message and data contained in a transmission received on the broadcast channel.

In a second exemplary embodiment there is provided a method for controlling access to a Secondary Cell Carrier (SCC) by a user terminal in a communication network, said user terminal having a first functional state in which the user terminal is arranged to monitor for a broadcast channel associated with the SCC, and a second functional state, different to said first functional state, the method comprising:

receiving data indicative of a plurality of operational modes assigned to the SCC; and transmitting a signalling message comprising data indicative of said plurality of operational modes for receipt by the user terminal, whereby to configure the user terminal into the first functional state, wherein the user terminal selectively requests access to resources of the SCC on the basis of a comparison between data contained in said signalling message and data contained in a transmission received on the broadcast channel.

The first and second exemplary embodiments are most conveniently implemented in a Primary Cell Carrier (PCC). Embodiments also include a computer program comprising a set of instructions, which, when executed by a PCC, cause the PCC to perform a method according to the second embodiment.

In a third exemplary embodiment there is provided an apparatus for use in controlling access to a Secondary Cell Carrier (SCC) in a communication network, the apparatus comprising a processing system arranged to cause the apparatus to: receive data indicative of a plurality of operational modes assigned to the SCC; identify a said operational mode on the basis of a predetermined criterion relating to usage of resources in the communication network; and transmit data indicative of said identified operational mode for receipt by the user terminal on a broadcast channel associated with the SCC, whereby to control access to said SCC.

In a fourth exemplary embodiment there is provided a method for controlling access by a user terminal to a Secondary Cell Carrier (SCC) in a communication network, the method comprising:

while being served by a Primary Cell Carrier (PCC), receiving a transmission originating from said PCC, the transmission comprising data indicative of a plurality of operational modes assigned to the SCC; thereafter monitoring for a broadcast channel associated with said SCC, said broadcast channel comprising data indicative of a said operational mode identified by the SCC;

responsive to detection of said broadcast channel, determining said identified operational mode on the basis of a comparison between data received on the broadcast channel and data contained in the transmission received from the PCC; and selectively requesting access to resources of said SCC on the basis of the determined operational mode.

The third and fourth exemplary embodiments are most conveniently implemented in a SCC. Embodiments also include a computer program comprising a set of instructions, which, when executed by a SCC, cause the SCC to perform a method according to the fourth embodiment.

In a fifth exemplary embodiment there is provided an apparatus for use in controlling access by a user terminal to a Secondary Cell Carrier (SCC) in a communication network, the apparatus comprising a processing system arranged to cause the apparatus to: while being served by a Primary Cell Carrier (PCC), receive a transmission originating from said PCC, the transmission comprising data indicative of a plurality of operational modes assigned to the SCC; thereafter monitor for a broadcast channel associated with said SCC, said broadcast channel comprising data indicative of a said operational mode identified by the SCC; responsive to detection of said broadcast channel, determine said identified operational mode on the basis of a comparison between data received on the broadcast channel and data contained in the transmission received from the PCC; and selectively request access to resources of said SCC on the basis of the determined operational mode.

In a sixth exemplary embodiment there is provided a method for controlling access by a user terminal to a Secondary Cell Carrier (SCC) in a communication network, the method comprising:

while being served by a Primary Cell Carrier (PCC), receiving a transmission originating from said PCC, the transmission comprising data indicative of a plurality of operational modes assigned to the SCC; thereafter monitoring for a broadcast channel associated with said SCC, said broadcast channel comprising data indicative of a said operational mode identified by the SCC;

responsive to detection of said broadcast channel, determining said identified operational mode on the basis of a comparison between data received on the broadcast channel and data contained in the transmission received from the PCC; and selectively requesting access to resources of said SCC on the basis of the determined operational mode.

The fifth and sixth exemplary embodiments are most conveniently implemented in a user terminal. Embodiments also include a computer program comprising a set of instructions, which, when executed by a user terminal, cause the user terminal to perform a method according to the sixth embodiment.

These and other embodiments and aspects are detailed below with particularity.

DETAILED DESCRIPTION

Embodiments are concerned with controlling access by a user terminal to a Secondary Cell Carrier (SCC) in a communication network.

In the following, examples and embodiments of the present invention are described with reference to the drawings. For illustrating the present invention, the examples and embodiments will be described in connection with a cellular communication network based on a 3GPP LTE-A system. However, it is to be noted that the present invention is not limited to an application using such types of communication system, but is also applicable in other types of communication systems and the like.

A basic system architecture of a communication network where examples of embodiments of the invention are applicable may comprise a commonly known architecture of one or more communication networks comprising a wired or wireless access network subsystem and a core network. An exemplary communication network will now be described with reference to FIG. 1A. The communication network 10 may comprise a Primary Cell Carrier (PCC) 80 comprising a Primary Cell (PCell) 81, and a Secondary Cell Carrier (SCC) 30 comprising a Secondary Cell (SCell) 1. It will be appreciated by those skilled in the art that the network may comprise one or more further PCCs and/or one or more further SCCs, such as a further SCC 90 comprising an SCell 2. A user terminal 50 or another device having a similar function, such as a modem chipset, a chip, a module etc., which can also be part of a user terminal or attached as a separate element to a user terminal, or the like, is able to communicate with the PCC 80, the SCC 30 and/or the further SCC 90 via one or more channels for transmitting several types of data.

Figure 1A:
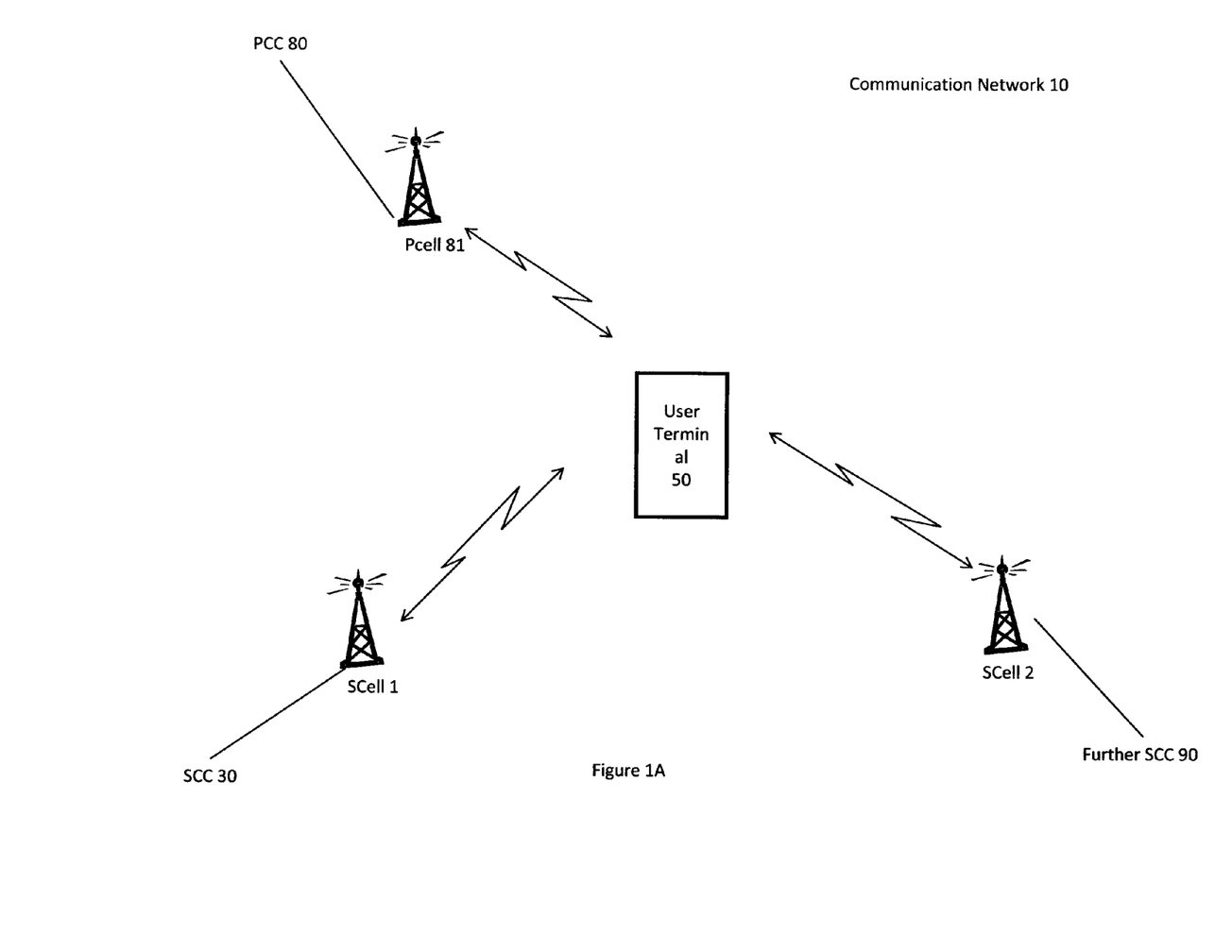
FIG. 1A is a simplified block diagram of a communication network within which embodiments operate.

The communication network 10 may additionally be in communication with various mobility management entities (not shown), which facilitate mobility of user terminals across various carriers, and/or network management entities, which manage resources of the communication network.

The general functions and interconnections of the described elements, which also depend on the actual network type, are known to those skilled in the art and described in corresponding specifications, so that a detailed description thereof is omitted herein. However, it is to be noted that several additional network elements and signalling links may be employed for a communication connection to or from user terminals, PCCs or SCCs, besides those described in detail herein below.

Figure 1B:
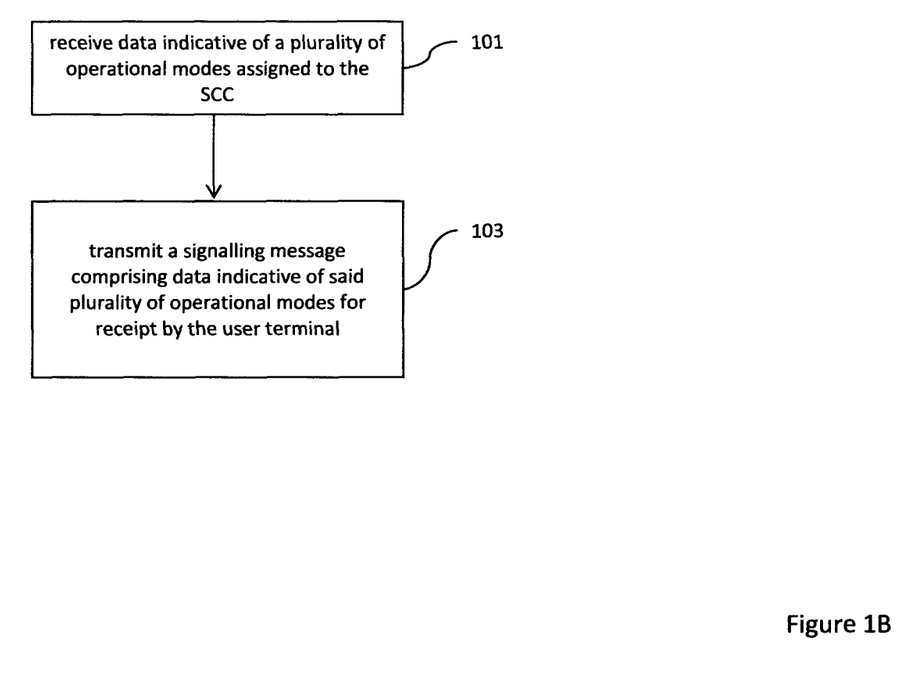
FIG. 1B is a logic flow diagram that illustrates the operation of a method, and a result of execution of computer program instructions embodied on a computer readable memory, in accordance with exemplary embodiments.
Figure 2:
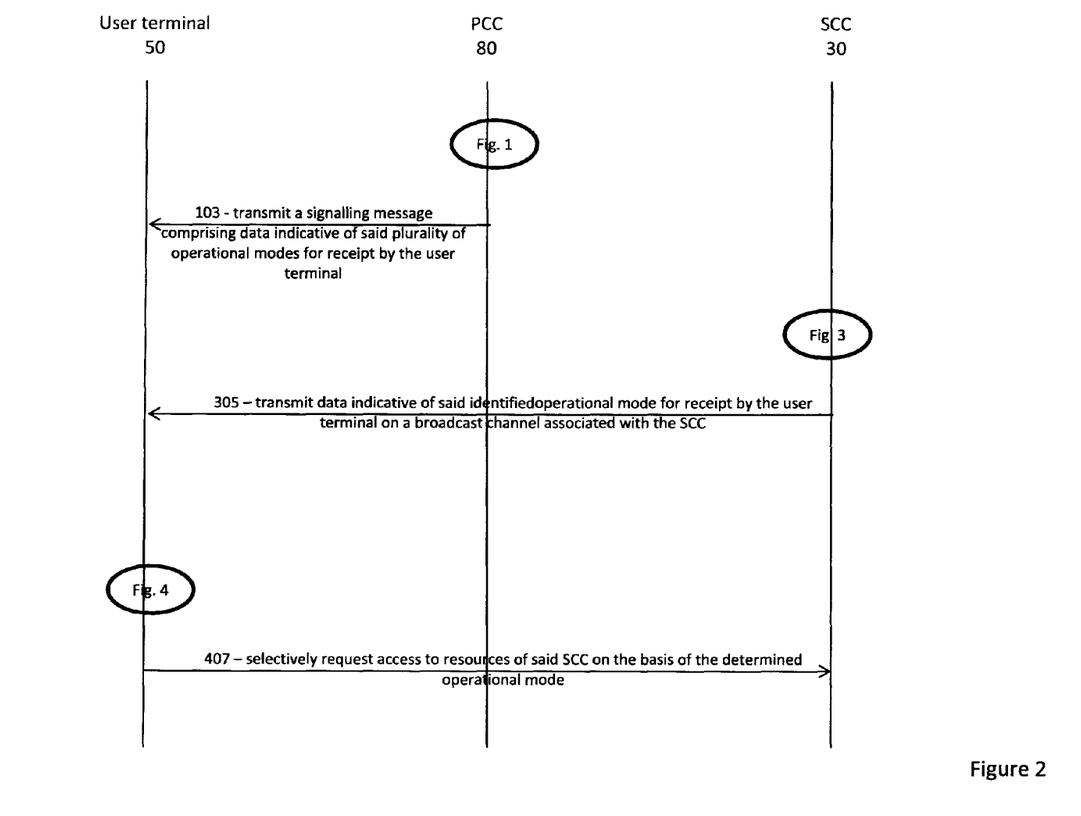
FIG. 2 is a flow diagram that illustrates the various steps performed by UE, SCC and PCC according to embodiments.

Referring to FIGS. 1B and 2, in accordance with an exemplary embodiment, the user terminal 50 establishes access to the aforementioned PCC 80 according to conventional mechanisms, which are known to those skilled in the art. The PCC 80 receives data indicative of a plurality of operational modes assigned to the SCC 30 (step 101). These operational modes may be defined by an alphanumeric sequence and may be received from the aforementioned network management entity. Thereafter, the PCC 80 transmits a signalling message comprising data indicative of the plurality of operational modes for receipt by the aforementioned user terminal 50 (step 103).

As will be explained in more detail below, user terminals have a first functional state in which they monitor for a broadcast channel associated with SCCs, and a second functional state, different to the first functional state. The functional state of a given user terminal is controlled by the PCC, as, and in response to receipt of operational mode data in the signalling message from the PCC, the given user terminal is configured into the first functional state. As a result, the user terminal 50 only monitors for the broadcast channel in response to receiving the signalling message, i.e. in the first functional state. Thus, in the first functional state, the user terminal 50 is configured to actively monitor for the broadcast channel, whereas, in the second functional state, the user terminal 50 does not monitor for the broadcast channel. Furthermore, the PCC 80 actively controls monitoring of the broadcast channel at the user terminal 50, which may, for example, be in dependence on the availability of SCCs in the neighbourhood of the user terminal 50. Per conventional mechanisms, user terminals would have to continually scan for SCCs, which would be inefficient as regards the resources of user terminals. Thus, by provisioning data indicative of the operational modes, PCCs effectively indicate availability of SCCs and reduce the scanning overhead that would otherwise be incurred by the given user terminal.

Furthermore, and as will be explained in more detail below, user terminals are configured to determine an operational mode selected for operation by SCCs on the basis of the data contained in the signalling message and data contained in a transmission received on the broadcast channel, and thereafter act in accordance with the selected operational mode. As will be explained below, the broadcast channel is akin to a service advertisement mechanism, on which SCCs broadcast their services, such as wireless or radio access services, to recipient user terminals. For example, in the event that the selected operational mode indicates accessibility to the SCC 30, the user terminal 50 is configured to request access to resources of the SCC 30. Embodiments therefore provide an SCC activation mechanism that is controlled by the network, but in respect of which decisions relating to attachment and detachment from SCCs are taken by user terminals, thereby reducing the network mobility management overhead.

As regards the operational modes, without limitation these may be of a first, second, third or a fourth type. The operational mode of the first type indicates to the user terminal that the SCC 30 is in a discovery mode, in which the user terminal 50 may monitor the broadcast channel, but may not request access to resources of the SCC 30. The operational mode of the second type indicates to the user terminal 50 that the resources of the SCC 30 may be accessed by sending a suitable request. The operational mode of the third type indicates to the user terminal 50 that the resources of the SCC 30 are inaccessible. The operational mode of the fourth type indicates to the user terminal 50 that the communication network 50 is an assessment mode, in which case the user terminal 50 may transmit a message for use in such assessment. Each type of the operational mode is described in detail below.

In preferred arrangements, the PCC 80 selects an operational mode on the basis of a predetermined criterion relating to usage of resources in the communication network, and transmits data indicative of the selected operational mode via the SCC 30 for transmission on the broadcast channel, thereby controlling access to resources of the SCC 30. As will be explained below, in alternative arrangements, the SCC 30 may independently select an operational mode for transmission on the broadcast channel or the SCC 30 may perform such selection in cooperation with PCC 80. In exemplary arrangements, the SCC 30 may perform such selection independently if the selection is based on usage of resources in the SCC 30, and the PCC 80 may control such selection where the selection is based on usage of resources in the communication network 10. Without limitation, in either of these exemplary arrangements, the SCC 30 and the PCC 80 may cooperate with each other for performing such selection.

In at least some arrangements, the predetermined criterion comprises a load characteristic associated with the SCC 30, and the PCC 80 monitors for the load characteristic in cooperation with the SCC 30. Without limitation, such cooperation may involve exchange of status messages between the PCC 80 and the SCC 30. As regards the load characteristic associated with the SCC30, the load characteristic may comprise available resources on the SCC 30.

The predetermined criterion may additionally or alternatively comprise an estimation of a number of user terminals within the coverage of the SCC 30. To that end, the PCC 80 may receive data in relation to the SCC 30 for the user terminal 50, and perform an estimation of the number of user terminals on the basis of such received data in relation to the SCC 30. The user terminal 50 may transmit such data in relation to the SCC 30 of its own volition. For example, user terminals may be configured to transmit such data in response to the detection of broadcast channels.

Alternatively, the PCC 80 may cause the user terminal 50 to transmit such data in relation to the SCC 30 by transmitting data indicative of an operational mode of the aforementioned fourth type via the SCC 30 for transmission on the broadcast channel. As briefly described above, the operational mode of the fourth type causes user terminals to transmit data in relation to the SCC 30 to the PCC 80, which may, for example, include a verification request in relation to the SCC 30, and/or a report in relation to the SCC 30 comprising reference signal receive power (RSRP) and/or reference signal receive quality (RSRQ) measurements. The PCC 80 may, for example, cause transmission of the operational mode of the fourth type from time to time to enable estimation of a number of user terminals within the coverage of each of the neighbouring SCCs for use in estimating likely capacity requirements in the communication network 10, whereby to effectively utilise network resources. On the basis of such an estimation, the PCC 80 may then cause transmission of an operational mode of the aforementioned second type, which, as noted above and will be explained in more detail below, indicates accessibility to resources of a corresponding SCC 30, on the broadcast channel associated with the SCC 30 and causes transmission of an operational mode of the aforementioned third type, which, as noted above and will be explained in more below, indicates inaccessibility to resources of a corresponding SCC, on a broadcast channel associated with the further SCC 90, as a result selectively controlling access to resources of the SCC 30 and the further SCC 90.

The predetermined criterion may additionally or alternatively comprise a bandwidth requirement of the user terminal 50, which may be determined by the PCC 80 in cooperation with the user terminal 50. Such cooperation may involve an exchange of messages in relation to bandwidth/capacity negotiation between the PCC 80 and the user terminal 50.

The PCC 80 may further configure operational mode data in relation to one or more further SCCs on the user terminal 50, thereby enabling the user terminal 50 to access one or more further neighbouring SCCs. For each of one or more neighbouring further SCCs, the PCC 80 receives a plurality of further operational modes assigned to a given SCC, and transmits a further signalling message comprising data indicative of the plurality of further operational modes for receipt by the user terminal 50, thereby configuring the user terminal 50 for access to the given SCC. Alternatively, the data indicative of the plurality of further operational modes may be transmitted within the aforementioned signalling message comprising data indicative of the plurality of operational modes assigned to the SCC 30.

Each of the neighbouring SCCs has a unique set of operational modes assigned thereto, which means that a given operational mode is indicative of a corresponding SCC in a given predetermined area. This may be defined on the basis of a macro cell coverage area, thereby allowing the communication network 10 to effectively reuse operational modes for further SCCs.

The PCC 80 may additionally provide data indicative of a predetermined cell reselection timer to the user terminal, so as to cause the user terminal 50, while being served by the SCC 30, to select the further neighbouring SCC 90 in accordance with the predetermined cell reselection timer. Data indicative of the predetermined cell reselection timer may be provided to the user terminal 50 within the aforementioned signalling message. As will be appreciated, by provisioning the cell reselection timer, the PCC 80 provides a means of controlling cell selection and, for example, prevents excessively frequent cell selection and reselection by user terminals, thereby reducing network load.

The PCC 80 may additionally provide a predetermined monitoring timer associated with the aforementioned broadcast channel, and in this way configures the user terminal 50 to periodically monitor for the broadcast channel on the basis of a monitoring time interval determined from of the monitoring timer. As a result, the user terminal 50 periodically monitors for the broadcast channel, which results in a saving of e.g. battery resources of the user terminal 50.

The PCC 80 may transmit the aforementioned signalling message in a physical layer signalling message. As is well known in the art, transmissions on the physical layer are faster and more efficient than, for example, transmissions on the medium access control (MAC) layer. Thus, the embodiments provide a fast and resource efficient mechanism for configuring data in relation to SCCs on user terminals.

An overview of the steps performed by the SCC 30 when transmitting on the broadcast channel in accordance with an exemplary embodiment will now be described with reference to FIG. 3. The SCC 30 receives data indicative of the aforementioned plurality of operational modes assigned thereto (step 301). These operational modes may be received from the PCC 80 or the aforementioned network management entity. Thereafter, the SCC 30 identifies an operational mode from the received plurality of operational modes on the basis of a predetermined criterion relating to usage of resources in the communication network 10 (step 303). The SCC 30 then transmits data indicative of the identified operational mode for receipt by the user terminal on the aforementioned broadcast channel associated with the SCC 30 (step 305).

As noted above, identification of the operational mode for transmission on the broadcast channel may be performed at the SCC 30 on the basis of, for example, usage of resources in the SCC 30, or, as will be explained below, may be actively controlled by the PCC 80 by transmitting a message comprising data indicative of a given operational mode for transmission on the broadcast channel, which may, for example, be on the basis of usage of resources in the communication network 10 as a whole. It will be appreciated that the SCC 30 and the PCC 80 may actively cooperate to identify a given operational mode for transmission on the broadcast channel.

The identified operational mode may, for example, be an operational mode of the aforementioned first type, in which case the user terminal 50 transmits a request for receipt by the SCC 30. As described above, the operational mode of the first type indicates to the user terminal that the SCC 30 is in a discovery mode, in which the user terminal 50 may monitor the broadcast channel, which may, for example, be to monitor for changes in data indicative of the operational mode transmitted thereon, but may not access the resources of the SCC 30. The request from the user terminal 50 indicates its intent to access the resources of the SCC 30, when they subsequently become accessible. Such a request may, for example, be a verification request, whereby to verify its authenticity to the SCC 30 and/or to verify the authenticity of the SCC 30.

The identified operational mode may alternatively be an operational mode of the aforementioned second type, in which case the resources of the SCC 30 are accessible to the user terminal 50 subject to a suitable request having been received from the user terminal 50.

The identified operational mode may alternatively be an operational mode of the aforementioned third type, in which case the resources of the SCC 30 are inaccessible to the user terminal 50. In this case, and in the event that user terminal 50 is being served by the SCC 30, the user terminal 50 may subsequently release resources of the SCC 30.

The identified operational mode may alternatively be an operational mode of the aforementioned fourth type, in which case the user terminal 50 transmits data in relation to the SCC 30 for receipt by the PCC 80. As described above, the data in relation to the SCC 30 may include a verification request in relation to the SCC 30, and/or a report in relation to the SCC 30 comprising reference signal receive power (RSRP) and/or reference signal receive quality (RSRQ) measurements. The operational mode of the fourth type indicates to the user terminal that communication network is in an assessment mode and in this mode the resources of the SCC 30 are inaccessible.

In response to a change in the usage of resources in the communication network 10, the SCC 30 may identify a further operational mode from the operational modes assigned thereto, different to the selected operational mode, on the basis of the predetermined criterion, and transmit data indicative of the further operational mode for receipt by the user terminal 50 on the broadcast channel. In this way, the SCC 30 can actively react to the current network conditions and control access thereto accordingly.

The predetermined criterion may comprise a load characteristic associated with the SCC 30; such a load characteristic may be associated with available resources on the SCC 30. For example, the predetermined criterion may relate to available capacity of SCell 1 or a number of user terminals permitted to concurrently use the SCC 30.

The predetermined criterion may alternatively or additionally comprise a load characteristic associated with the communication network 10. As mentioned above, to enable the PCC 80 in its monitoring of the load characteristic associated with the communication network 10, the SCC 30 may transmit data indicative of an operational mode of the aforementioned fourth type, which causes the user terminal to transmit data indicative of the SCC 30 to the PCC 80. As described above, this data may include a verification request in relation to the SCC 30, and/or a report in relation to the SCC 30 comprising reference signal receive power (RSRP) and/or reference signal receive quality (RSRQ) measurements.

The monitoring of the predetermined criterion may alternatively be performed on the PCC 80, in which case these network load characteristics may be used by the PCC 80 in selecting a given operational mode for transmission on the broadcast channel, whereby to control access to the SCC 30. The PCC 80 may transmit data indicative of the selected operational mode via the SCC 30 for transmission on the broadcast channel. The PCC 80 may alternatively send such message independently or separate to such monitoring. In response to receiving this message, the SCC 30 may transmit data indicative of an operational mode in accordance with the received message on the broadcast channel, thereby enabling the PCC 80 to actively control access to resources of the SCC 30.

The predetermined criterion may alternatively or additionally comprise an estimation of a number of user terminals within coverage of the SCC 30. That being the case, the SCC 30 may transmit data indicative of an operational mode of the aforementioned first type on the broadcast channel for receipt by the user terminal 50, which causes the user terminal 50 to transmit a message to the SCC 30 for use in such estimation. Such message may, for example, be a verification request.

The SCC 30 may receive access request messages, such as a Radio Resource Control (RRC) connection request, from the user terminal 50. In response, the SCC 30 selectively grants access to resources thereof in accordance with a given operational mode being transmitted on the broadcast channel. Such access to resources may involve granting access to radio resources of the SCell 1 corresponding to the SCC 30.

As described above, the broadcast channel is akin to a service advertisement channel, such as a Physical Discovery Channel (PDCH), and it may be transmitted over the physical layer, which has the aforementioned benefits of speed and efficiency. In addition, data indicative of a given operational mode identified for transmission may be periodically transmitted on the basis of a predetermined transmission interval.

An overview of the steps performed by the user terminal 50 when receiving the aforementioned signalling message and the aforementioned transmission on the broadcast channel will now be described with reference to FIGS. 2 and 4. While being served by the PCC, the user terminal 50 receives a transmission from the PCC 80 comprising a plurality of operational modes assigned to the SCC 30 (step 401). This transmission, as discussed above, is in the form of the aforementioned signalling message. Thereafter, the user terminal 50 monitors for the aforementioned broadcast channel associated with the SCC 30, the broadcast channel comprising data indicative of an operational mode identified for operation by the SCC 30 (step 403). In response to the detection of the broadcast channel, the user terminal 50 determines the identified operational mode on the basis of the data contained in the transmission received from the PCC 80 and the data received on the broadcast channel (step 405). The user terminal 50 then selectively requests access to the SCC 30 on the basis of the determined operational mode (step 407).

As is well known in the art, user terminals should be able to cope with a relative propagation delay difference of up to 30 μs among the component carriers to be aggregated in inter-band non-contiguous CA and a delay spread of up to 31.3 μs among the component carriers monitored. That being the case, upon synchronisation with the PCC 80, the maximum timing offset to estimate on the SCC 30 is approximately 31.3 μs. Thus, the user terminal 50 can obtain approximate synchronisation parameters for the SCC 30 by synchronising with the PCC 80, which, as is well known in the art, may be based on a primary and a secondary synchronisation signal, and thereafter obtain accurate time and frequency synchronisation parameters on the basis of the broadcast channel. Thus, the embodiments enable an accurate time and frequency synchronisation with the SCC 30.

As discussed above, the identified operational mode being advertised on the broadcast channel may change from time to time. That being the case, the user terminal 50 may monitor for a change in the identified operational mode on the basis of a comparison between further data received on the broadcast channel and the data received from the PCC 80, which, as mentioned above, comprises data indicative of a plurality of operational modes assigned to the SCC 30. In response to a change in the identified operational mode, the user terminal 50 may request access to resources of the SCC 30 in dependence on the change. For example, in the event that the identified operational mode changes from an operational mode of the aforementioned third type, which, as will be explained below, is indicative of inaccessibility to the SCC 30, to an operational mode of the aforementioned second type, which indicates accessibility to the SCC 30, the user terminal 50 may transmit a request to access resources of the SCC 30. Thus, user terminals actively react to the transmission on the broadcast channel in order to review their association with SCCs.

Figure 5:
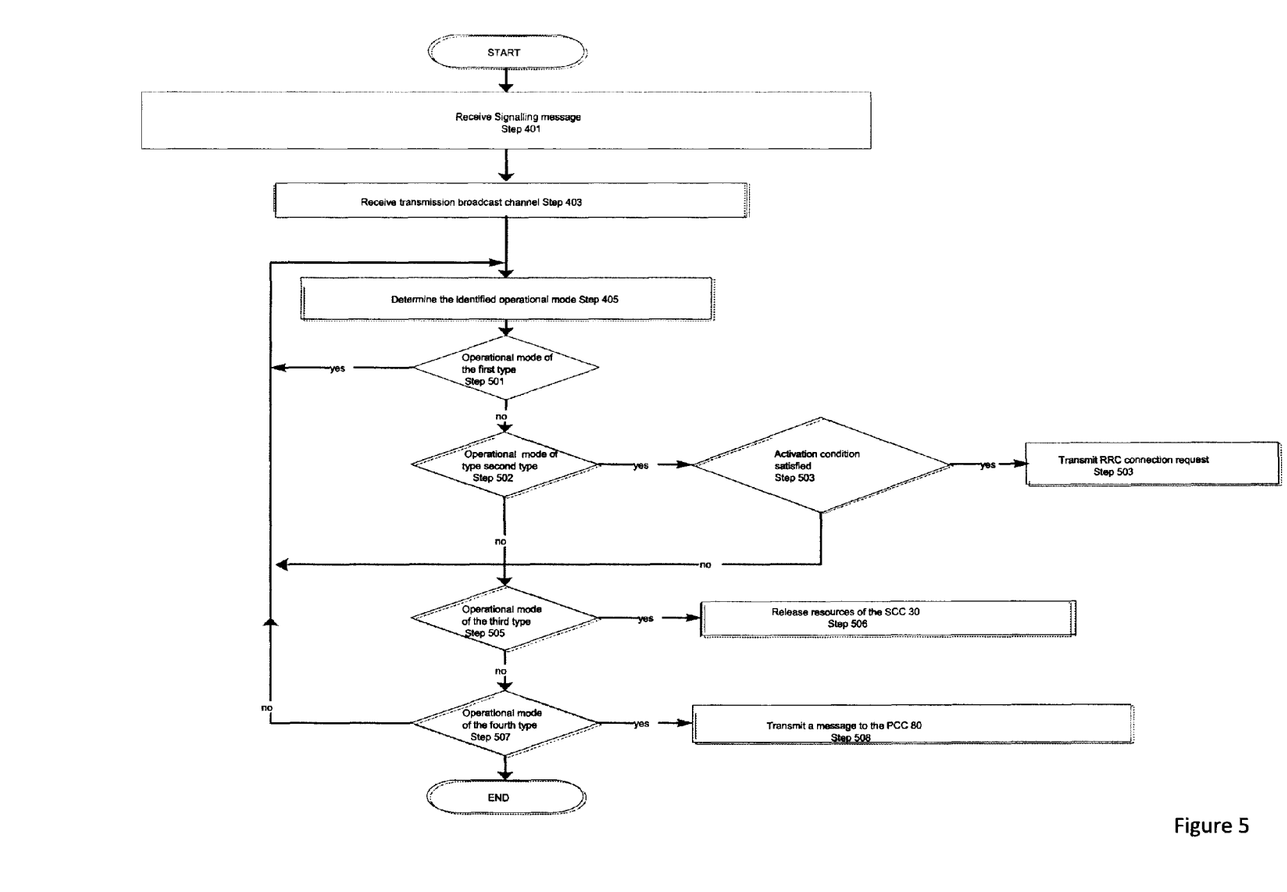
FIG. 5 is a flow diagram that illustrates the various steps performed by UE, SCC and PCC according to embodiments.

While being served by the SCC 80 and in the event that the changed operational mode is an operational mode of the aforementioned third type (505), which indicates inaccessibility of the SCC 30 to the user terminal 50, the user terminal 50 may release resources associated with the SCC 30 (step 506).

As described above, that the FCC 80 may provide data in relation to a plurality of SCCs to the user terminal 50. To that end, the user terminal 50 may receive a further transmission comprising data indicative of a further plurality of operational modes assigned to the further SCC 90, different to the SCC 30, and thereafter monitor for a further broadcast channel associated with the further SCC 90, on which data indicative of a further operational mode identified by the further SCC 90 is transmitted. In response to detecting the further broadcast channel, the user terminal 50 determines the identified further operational mode on the basis of the data contained in the further transmission received from the PCC 80 and data received on the further broadcast channel. In response, the user terminal 50 may selectively request access to resources of the further SCC 90 on the basis of the determined further operational mode. As will be appreciated, the above sequence of steps is repeated for each of neighbouring SCCs. By determining the identified operational modes for each of the neighbouring SCCs, the user terminal 50 determines those neighbouring SCCs to which it has access for use in carrier aggregation. Therefore, the carrier aggregation per the embodiments is initiated by user terminals, but under the supervision and control of the communication network 10.

An overview of transition of the user terminal 50 being served by the SCC 3 to the further SCC 90 will now be described with reference to FIG. 5. In the event that the determined further operational mode in relation to the further SCC 90 is an operational mode of the aforementioned first type (step 501), the user terminal 50 transmits a request for receipt by the further SCC 30, and thereafter monitors for a change in the determined operational mode. As described above, the operational mode of the first type indicates to the user terminal that the further SCC 30 is in a discovery mode, in which the user terminal 50 may monitor the broadcast channel, but may not request access to resources of the further SCC 30.

In the event that the determined further operational mode in relation to the further SCC 90 is an operational mode of the aforementioned second type (step 502), the transition to the further SCC 90 may be governed by an activation condition (step 503). An exemplary activation condition may comprise a determination that the signal quality associated with the SCC 30 is below a predetermined threshold, in which case the user terminal 50 may selectively request access to resources of the further SCC 90, which may include transmission of an RRC connection request for receipt by the further SCC 90 (step 504). In addition, the user terminal 50 may release resources of the SCC 80. Alternatively, the activation condition may be based on a change in the type of operational mode being transmitted on the broadcast channel associated with the SCC 90. In this case, upon a determination that the changed operational mode being transmitted on the broadcast channel is of the aforementioned third type, the user terminal 50 may transmit a request to access resources of the further SCC 90, which may include an RRC connection request (step 504).

In the event that the determined operational mode in relation to the further SCC 90 is an operational mode of the aforementioned fourth type (step 507), the user terminal 50 may transmit data in relation to the further SCC 30 for receipt by the PCC 80 (step 508), and thereafter monitors for a change in the determined operational mode. As described above, the operational mode of the fourth type indicates to the user terminal that communication network 10 is in an assessment mode and the resources of the further SCC 30 are inaccessible. Such an assessment, which as noted above is performed by the PCC 80, may involve an estimation of load conditions on the communication network 10, using data received from the user terminal 50. Responsive to such assessment, the PCC 80 and/or the further SCC 90 may cause a change in the selected operational mode being transmitted on the further broadcast channel.

The transition between the SCC 30 and the further SCC 90 may additionally be dependent upon a predetermined cell reselection timer, which may be provided to the user terminal 50 by the PCC 80 in the aforementioned signalling message. It will be appreciated by those skilled in the art that the predetermined cell reselection timer may alternatively be provided by the PCC 80 in a separate transmission or may be preconfigured on the user terminal 50.

Turning now to the broadcast channel, as described above, the broadcast channel may be transmitted periodically. That being the case, the signalling message sent by the PCC 80 may further comprise data indicative of predetermined monitoring timer associated with the broadcast channel. In response to receiving the predetermined monitoring timer, the user terminal 50 is configured to monitor for the broadcast channel on the basis of a monitoring interval determined on the basis of said predetermined monitoring timer.

For completeness, it is noted that the transmission from the PCC 80 comprising the plurality of operational modes assigned to the SCC 30 may be received by the user terminal in a physical layer signalling message.

FIG. 1B is a logic flow diagram which describes, broadly, the above exemplary embodiments from the perspective of a PCC 80.

Figure 3:
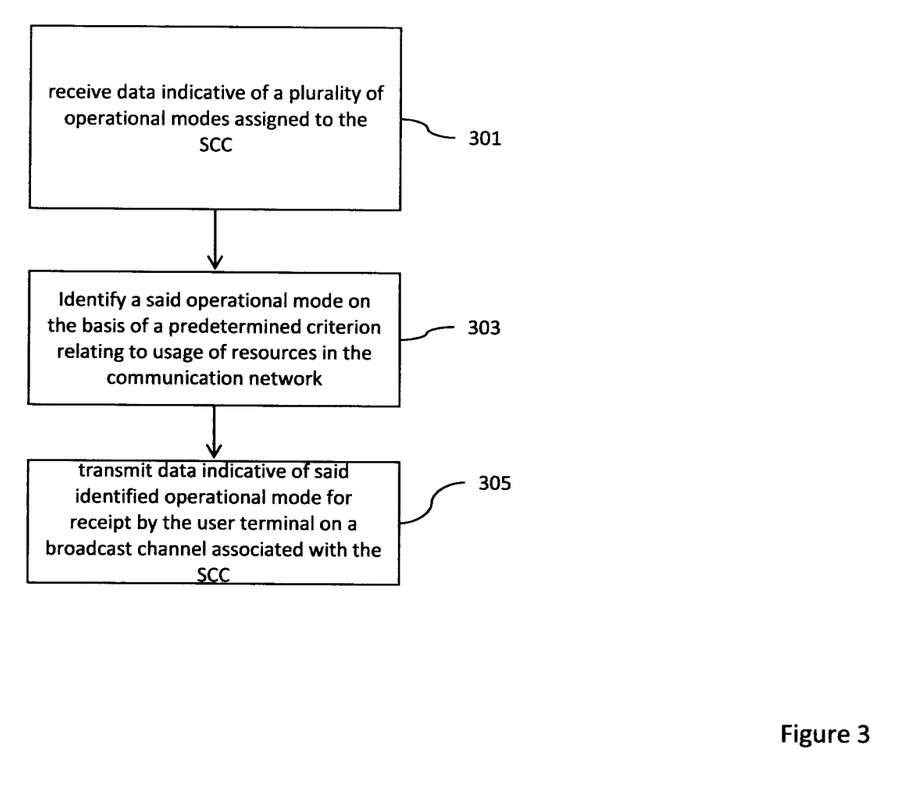
FIG. 3 is a logic flow diagram that illustrates the operation of a method, and a result of execution of computer program instructions embodied on a computer readable memory, in accordance with exemplary embodiments.

FIG. 3 is a logic flow diagram which describes, broadly, the above exemplary embodiments from the perspective of a SCC 30.

Figure 4:
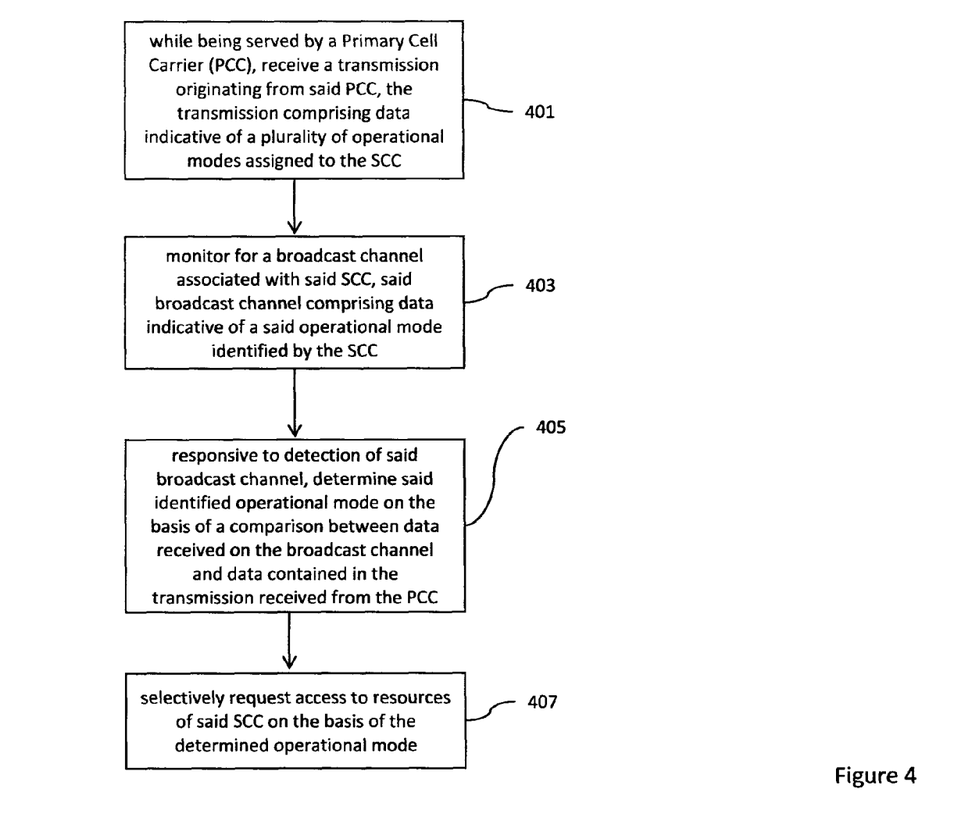
FIG. 4 is a logic flow diagram that illustrates the operation of a method, and a result of execution of computer program instructions embodied on a computer readable memory, in accordance with exemplary embodiments.

FIG. 4 is a logic flow diagram which describes, broadly, the above exemplary embodiments from the perspective of a user terminal 50.

FIGS. 1B, 3 and 4 represent results from executing a computer program or an implementing algorithm stored in the local memory of the FCC 80, the SCC 30 and the user terminal 50 respectively as well as illustrating the operation of a method and a specific manner in which the processor and memory with computer program/algorithm are configured to cause the PCC 80, the SCC 30 and the user terminal 50 respectively (or one or more components thereof) to operate. The various blocks shown in these Figures may also be considered as a plurality of coupled logic circuit elements constructed to carry out the associated function(s), or specific result or function of strings of computer program code stored in a computer readable memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 6:
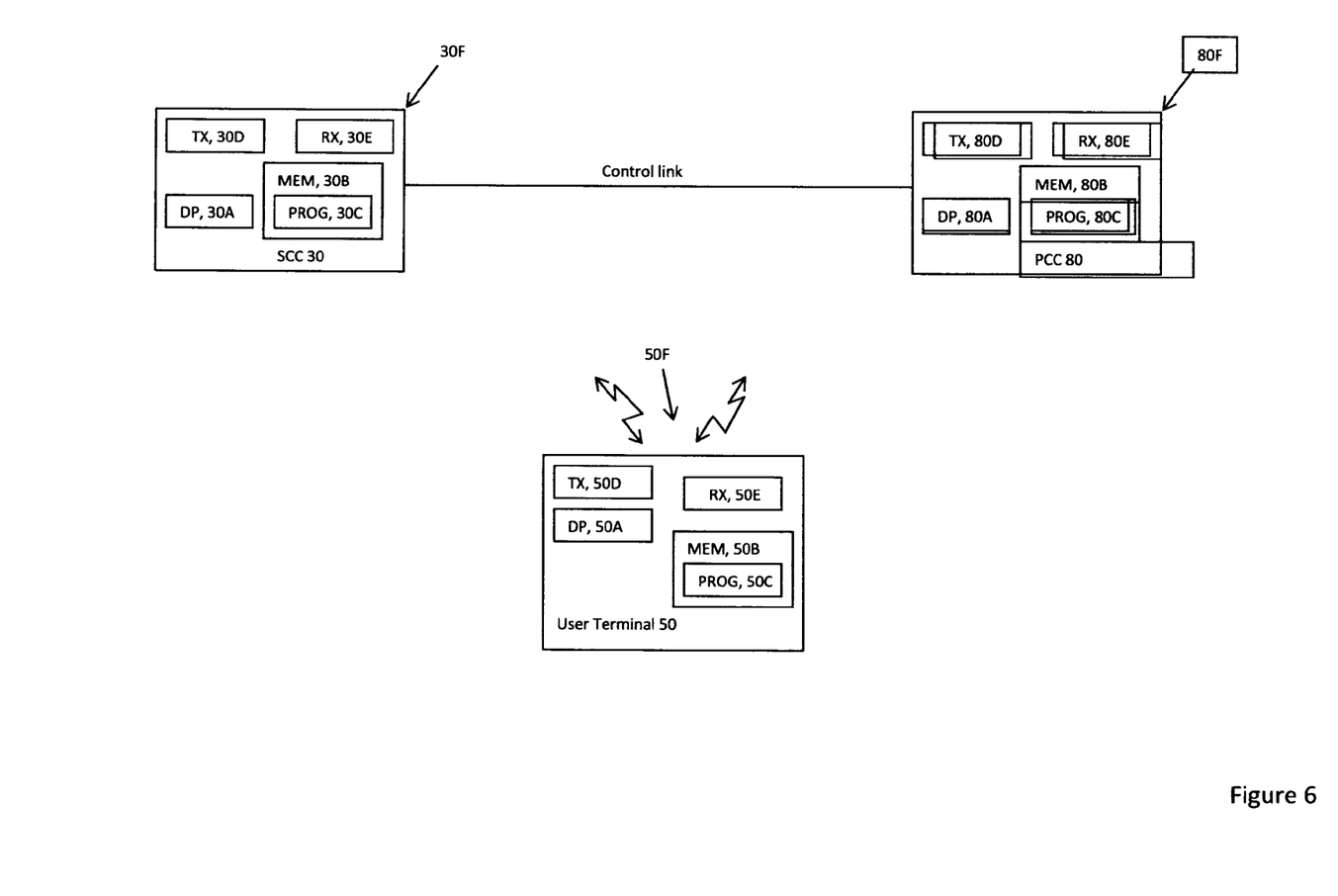
FIG. 6 is a simplified block diagram of various network devices, which are exemplary electronic devices suitable for use in practicing the exemplary embodiments.

Reference is now made to FIG. 6 for illustrating a simplified block diagram of various electronic devices and apparatus that are suitable for use in practicing the exemplary embodiments of this invention. In FIG. 6 a PCC 80 is adapted for communication over a wireless link with a user terminal 50, such as a mobile terminal. The PCC 80 may be a macro eNodeB, a remote radio head or relay station, or other type of base station/cellular network access node.

The user terminal 50 include processing means such as at least one data processor (DP) 50A, storing means such as at least one computer-readable memory (MEM) 50B storing at least one computer program (PROG) 50C, and also communicating means such as a transmitter TX 50D and a receiver RX 50E for bidirectional wireless communications with the SCC 30 and the PCC 80 via one or more antennas 50F.

The PCC 80 includes its own processing means such as at least one data processor (DP) 80A, storing means such as at least one computer-readable memory (MEM) 80B storing at least one computer program (PROG) 80C, and communicating means such as a transmitter TX 80D and a receiver RX 80E for bidirectional wireless communications with other devices under its control via one or more antennas 80F. There is a data and/or control path, termed at FIG. 6 as a control link which in the LTE-A system may be implemented as an S1 interface, coupling the PCC 80 with the SCC 30 and over which the PCC 80 may transmit control messages, such as an operational mode for transmission on a broadcast channel in various embodiments above. The PCC 80 also has stored in its local memory at 80B the database which has the service credentials for all user terminals authorised for the network, as the case may be for the various embodiments detailed above.

Similarly, the SCC 30 includes processing means such as at least one data processor (DP) 30A, storing means such as at least one computer-readable memory (MEM) 30B storing at least one computer program (PROG) 30C, and communicating means such as a modem 30H for bidirectional communication with the PCC 80 over the control link. While not particularly illustrated for the user terminal, the PCC 80 and the SCC30, those devices are also assumed to include as part of their wireless communicating means a modem which may be inbuilt on a radiofrequency RF front end chip within those devices 50, 80, 30 and which chip also carries the TX 50D/80D/30D and the RX 50E/80E/30E.

At least one of the PROGs 50C in the user terminal 50 is assumed to include program instructions that, when executed by the associated DP 50A, enable the device to operate in accordance with the exemplary embodiments of this invention, as detailed above. The PCC 80 and the SCC 30 also have software stored in their respective MEMs to implement certain aspects of these teachings. In these regards the exemplary embodiments of this invention may be implemented at least in part by computer software stored on the MEM 50B, 80B, 30B which is executable by the DP 50A of the user terminal 50, DP 80A of the PCC 80 and/or DP 30A of the SCC 30, or by hardware, or by a combination of tangibly stored software and hardware (and tangibly stored firmware). Electronic devices implementing these aspects of the invention need not be the entire devices as depicted at FIG. 6, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 50B, 80B, and 30B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 50A, 30A and 80A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus for use in controlling access to a Secondary Cell Carrier (SCC) by a user terminal in a communication network, said user terminal having a first functional state in which the user terminal is arranged to monitor for a broadcast channel associated with the SCC, and a second functional state, different to said first functional state, the apparatus comprising a processing system, wherein the processing system comprises at least one processor and at least one memory storing a set of computer instructions, in which the processing system is arranged to cause the apparatus to:

receive data indicative of a plurality of operational modes assigned to the SCC; and transmit a signaling message comprising data indicative of said plurality of operational modes for receipt by the user terminal, to configure the user terminal into the first functional state; and receiving from the user terminal a request for access to resources of the SCC, the request based on a comparison between the data contained in said signaling message and data provided to the user terminal on the broadcast channel.

2. The apparatus according to claim 1, wherein the processing system is arranged to:

select a said operational mode on the basis of a predetermined criterion relating to usage of resources in the communication network; and transmit data indicative of said selected operational mode via the SCC for transmission on the broadcast channel.

3. The apparatus according to claim 2, wherein the predetermined criterion comprises a load characteristic associated with the SCC, and the processing system is arranged to monitor for said load characteristic in cooperation with the SCC.

4. The apparatus according to claim 2, wherein said predetermined criterion comprises an estimation of a number of user terminals within coverage of the SCC, and the processing system is arranged to receive data in relation to the SCC from the user terminal, and to perform said estimation on the basis of said received data.

5. The apparatus according to claim 4, wherein the processing system is arranged to transmit data indicative of a said operational mode of a first type via the SCC for transmission on the broadcast channel, whereby to cause the user terminal to transmit said data in relation to the SCC.

6. The apparatus according to claim 2, wherein the predetermined criterion comprises a bandwidth requirement of the user terminal, and the processing system is arranged to determine said bandwidth requirement in cooperation with the user terminal.

7. The apparatus according to claim 2, wherein the processing system is further arranged to:
 receive data indicative of a plurality of further operational modes, different to said plurality of operational modes, assigned to a further, different, SCC; and
 transmit a further, different, signaling message comprising data indicative of said plurality of further operational modes for receipt by the user terminal.

8. The apparatus according to claim 7, wherein said transmission further comprises data indicative of a predetermined cell reselection timer, whereby to cause said user terminal, while being served by the SCC, to selectively request access to resources of said further SCC in accordance with said predetermined cell reselection timer.

9. The apparatus according to claim 1, wherein the signaling message further comprises a predetermined monitoring timer associated with said broadcast channel, whereby to configure the user terminal to periodically monitor for said broadcast channel on the basis of a monitoring interval determined on the basis of said predetermined monitoring timer.

10. An apparatus for use in controlling access to a Secondary Cell Carrier (SCC) in a communication network, the apparatus comprising a processing system, wherein the processing system comprises at least one processor and at least one memory storing a set of computer instructions, in which the processing system is arranged to cause the apparatus to:
 receive data indicative of a plurality of operational modes assigned to the SCC;
 identify a said operational mode on the basis of a predetermined criterion relating to usage of resources in the communication network; and
 transmit data indicative of said identified operational mode for receipt by a user terminal on a broadcast channel associated with the SCC, to control access to said SCC.

11. The apparatus according to claim 10, wherein, responsive to a change in usage of resources in the communication network, the processing system is arranged to:
 identify a further said operational mode, different to said identified operational mode, on the basis of the predetermined criterion; and
 transmit data indicative of said further identified operational mode for receipt by the user terminal on the broadcast channel.

12. The apparatus according to claim 10, wherein the predetermined criterion comprises a load characteristic associated with the SCC, and the processing system is arranged to monitor for said load characteristic.

13. The apparatus according to claim 10, wherein said predetermined criterion comprises an estimation of a number of user terminals within coverage of the SCC, and the processing system is arranged to transmit data indicative of a said operational of a first type on the broadcast channel for receipt by the user terminal, whereby to cause receipt of a message from said user terminal for use in said estimation.

14. The apparatus according to claim 10, wherein the predetermined criterion comprises a load characteristic associated with the communication network, and the processing system is arranged to transmit data indicative of a said operational mode of a second type on the broadcast channel for receipt by the user terminal, whereby to cause the user terminal to transmit data indicative of the SCC for receipt by a PCC, thereby enabling the PCC to monitor for said load characteristic.

15. The apparatus according to claim 10, wherein said identification is based on a message comprising data indicative of a said operational mode received from a Primary Cell Carrier (PCC), and, responsive to receipt of said message, the processing system is arranged to transmit data indicative of the operational mode in accordance with said message for receipt by the user terminal on the broadcast channel.

16. The apparatus according to claim 10, wherein the processing system is further arranged to:
 receive a request to access resources of the SCC from the user terminal, said request comprising a Radio Resource Control (RRC) connection request; and
 selectively grant access to resources of the SCC in dependence on a given said identified operational mode being transmitted on the broadcast channel.

17. The apparatus according to claim 10, wherein the processing system is arranged to transmit said broadcast channel on a physical layer.

18. The apparatus according to claim 10, wherein the processing system is configured to periodically transmit data indicative of a given said operational mode on said broadcast channel on the basis of a predetermined transmission interval.

19. An apparatus for use in controlling access by a user terminal to a Secondary Cell Carrier (SCC) in a communication network, the apparatus comprising a processing system, wherein the processing system comprises at least one processor and at least one memory storing a set of computer instructions, in which the processing system is arranged to cause the apparatus to:
 while being served by a Primary Cell Carrier (PCC), receive a transmission originating from said PCC, the transmission comprising data indicative of a plurality of operational modes assigned to the SCC; thereafter
 monitor for a broadcast channel associated with said SCC, said broadcast channel comprising data indicative of a said operational mode identified by the SCC;
 responsive to detection of said broadcast channel, determine said identified operational mode on the basis of a comparison between the data received on the broadcast channel and the data contained in the transmission received from the PCC; and
 selectively request access to resources of said SCC on the basis of the determined operational mode.

20. The apparatus according to claim 19, wherein the processing system is arranged to monitor for a change in said identified operational mode on the basis of a comparison between further data received on the broadcast channel and data contained in the transmission received from the PCC.

* * * * *